United States Patent
Mizuyama et al.

[11] Patent Number: 5,946,693
[45] Date of Patent: Aug. 31, 1999

[54] SYSTEM FOR COMMUNICATING AMONG OBJECTS AND ESTABLISHING LINKAGES AMONG THEM AND METHOD THEREOF

[75] Inventors: Makoto Mizuyama; Tatsuya Kainuma, both of Nagoya, Japan

[73] Assignee: Fujitsu Limited, Kawasaki, Japan

[21] Appl. No.: 08/896,657

[22] Filed: Jul. 18, 1997

[30] Foreign Application Priority Data

Oct. 31, 1996 [JP] Japan .................................. 8-289586

[51] Int. Cl.<sup>6</sup> .................................................. G06F 17/30
[52] U.S. Cl. .......................... 707/103; 395/683; 395/701; 395/710; 395/712; 345/346
[58] Field of Search .................................. 395/683, 682, 395/710, 712, 680, 701; 707/103; 345/346

[56] References Cited

U.S. PATENT DOCUMENTS

| | | | |
|---|---|---|---|
| 4,967,371 | 10/1990 | Muranaga et al. ...................... | 364/513 |
| 5,604,907 | 2/1997 | Conner et al. ........................... | 395/683 |
| 5,768,586 | 6/1998 | Zweben et al. .......................... | 395/653 |

Primary Examiner—Thomas G. Black
Assistant Examiner—Hosain T. Alam
Attorney, Agent, or Firm—Staas & Halsey, LLP

[57] ABSTRACT

In an observable a slot is defined in which a "name", "data", and read/write procedures are stored that execute read and write operations with respect to those data. An observer acquires a slot descriptor by opening the slot with the "name" stored in it, then executes a read method or a write method with respect to it to call the read/write procedure and access the "data" stored in the slot. If the "data" in the slot are modified by the execution of the write procedure, the observable issues update events to all of the observers connected to it. When each observer receives that update event, the data modification is confirmed by execution of an isModified method.

13 Claims, 4 Drawing Sheets

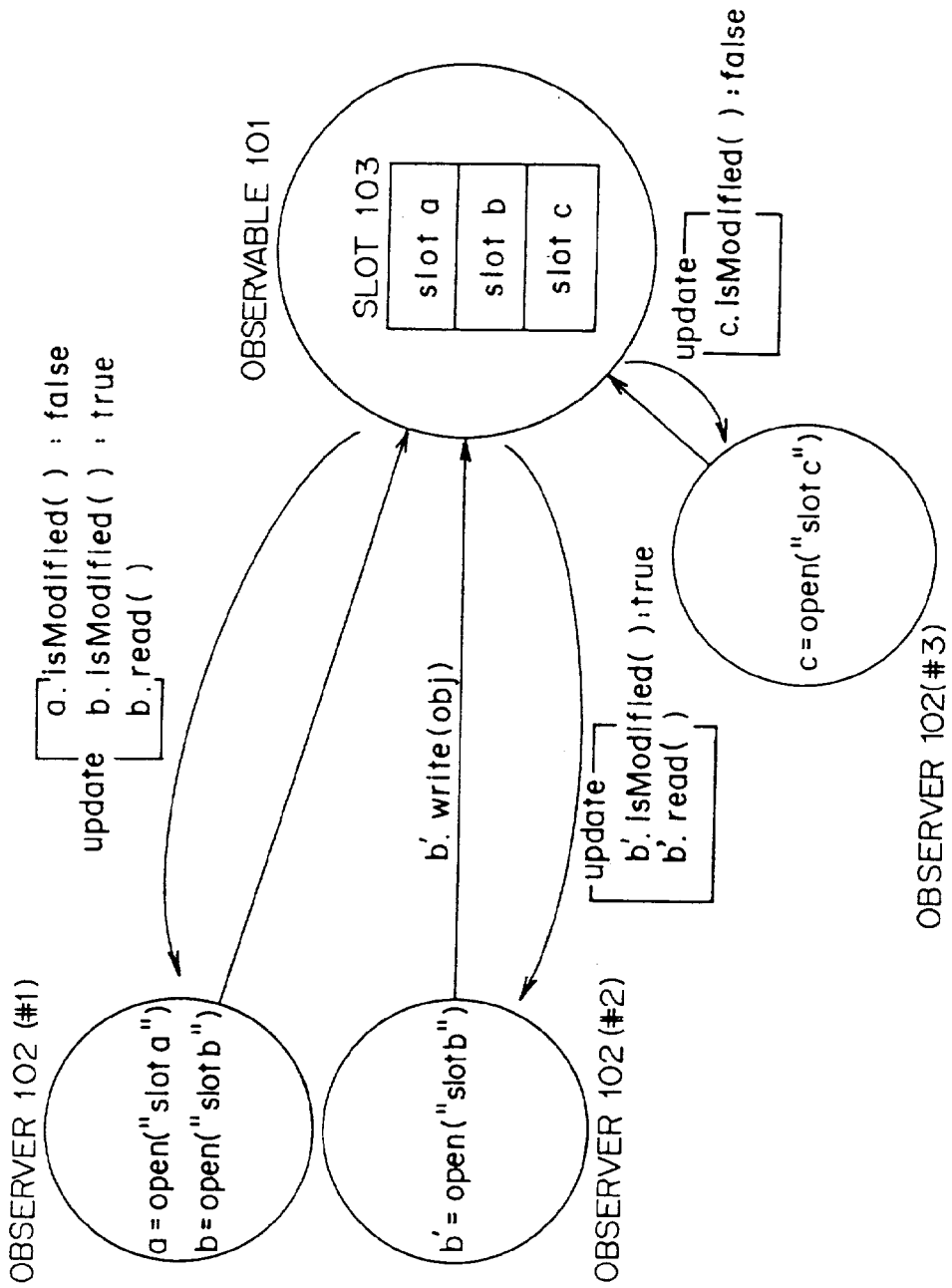
F I G. 1

```
SlotDescriptor open(String slotname)    (a) ⎫  METHOD OF CONTROL OF THE REFERENCE
                                            ⎬  RELATIONSHIP WITH RESPECT TO THE OBSERVABLE 101
void close(SlotDescriptor desc)         (b) ⎭

Object read()                           (c) ⎫
                                            ⎬  METHOD OF THE PROTOCOL RELATED TO THE SLOT DESCRIPTOR
void write(Object obj)                  (d) ⎪ boolean isModified()                    (e) ⎪

TYPE INFORMATION type()                 (f) ⎭ void update()                           (g) ...  METHOD OF PROTOCOL THAT POSSESSES THE DIRECTION
                                                 FROM THE OBSERVABLE 101 TO THE OBSERVER 102
```

F I G. 3

(a) DIAGRAM SHOWING CONFIGURATION
OF RELATIONSHIP TO NETWORK

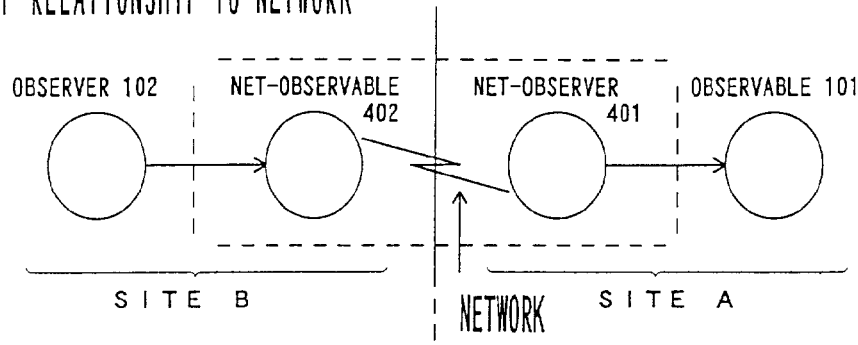

(b) EXAMPLES OF CODING OF THE NET-
OBSERVER 401 AND THE NET-OBSERVA-
BLE 402

RECEPTION DEMON WHICH POSSESSES
THE NET-OBSERVABLE 402

```
for(;;) {                              #1
    read(soc);                         #2
    switch( ) {                        #3
        case ...:
            :
        case END IDENTIFIER            #4
            post(waitId);              #5
            return;                    #6
    }                                  #7
}                                      #8
```

WRITE PROCEDURE OF ONE
OF THE SLOTS 103 OF THE
NET-OBSERVABLE 402

```
NetObservable::write(Obj obj) {        #9
write(soc,<WRITE IDENTIFIER,NAME,
            obj,waitId>);              #10
wait(waitId);                          #11
    :
                                       #12
```

RECEPTION DEMON WHICH POSSESSES
THE NET-OBSERVER 401

```
for(;;) {                              #13
    <COMMAND IDENTIFIER, NAME,
      obj,waitId>=read(soc);           #14
    switch(COMMAND IDENTIFIER) {       #15
        case ...;
            :
        case WRITE IDENTIFIER:         #16
    ─ ─ ─ ─ ─ ─ ─ ─ ─ ─ ─ ─ ─ ─ ─ ─
    | THE SPECIFIED SLOT 103 OF THE  |
    | OBSERVABLE 101 IS OBTAINED FROM|
    | "NAME"; THEN THE write METHOD IS|
    | STARTED WITH "obj" AS AN        |
    | ARGUMENT; THEN THE FOLLOWING IN-|
    | STRUCTION IS EXECUTED           |
    | write(soc,<END IDENTIFIER,      |
    |                      waitId>);  | #17
    | return;                         |
    ─ ─ ─ ─ ─ ─ ─ ─ ─ ─ ─ ─ ─ ─ ─ ─
    }                                  #18
}                                      #19
```

FIG. 4

SYSTEM FOR COMMUNICATING AMONG OBJECTS AND ESTABLISHING LINKAGES AMONG THEM AND METHOD THEREOF

BACKGROUND OF THE INVENTION

1. Field of the Invention

The present invention relates to a technology for communication between objects that will establish links between them.

2. Description of the Related Art

With the spread of object-oriented programming, there is a demand for a technology that will permit more flexible linkage between objects.

One well-known specific example of linkage between objects is provided by development tools for window-based software applications. By using such tools, the user can visually combine objects such as window frames, buttons and list boxes by using a mouse or similar device, which makes it easy to develop applications that will run on a GUI (Graphical User Interface). In this case, it is necessary for the objects to perform while mutually linked to one another, and technology which permits the objects to be linked flexibly and effectively is important.

Another specific example of linkage between objects that is well-known is the technology that permits a table object (spreadsheet) that is a server created by a spreadsheet application to be embedded in a document object that is a client created by a word processor application. In this case also, it is necessary for the linkages between objects to be flexible.

Well-known existing functions that provide flexible linkages between objects as described above include OLE (Object Linking and Embedding) and OpenDoc. In these functions, as described in the above-mentioned example of linkage between a document object and a table object, a server resource which is one object can be embedded in a client which is another object.

However, the existing technology has a first problem that one server resource that is embedded in one client cannot be embedded in another client at the same time.

In addition, the existing technology has a second problem that a client in which a server resource is embedded cannot itself be embedded as a server resource in another client.

Further, in the existing technology, information as to which server resource is embedded in which client must be clearly stated in the source code of the class that created the client. That is to say, the existing technology has a third problem that the relation between the server resource and the client is statically predetermined; that relationship cannot be dynamically determined at a time of execution.

SUMMARY OF THE INVENTION

This invention was conceived in view of the background described above, for the purpose of providing a more flexible linkage between objects.

The first aspect of the present invention depends on having a method of communication between a plurality of objects.

In the first aspect of the present invention, first, as shown in FIG. 1, an observable object (observable 101), for which one or more groups of slot data (slot 103) are defined, in which a slot name, data, and an access procedure code which performs access to those data are stored, is formed. This access procedure code could, for example, be a read procedure code that reads out data stored in those slot data, a write procedure code that changes data stored in those slot data, or a type procedure code that detects the type of the data stored in those slot data.

Next, an observer object (observer 102), for which a first method code that is specified by specifying the slot name for whichever type of slot data defined in the observable object are stored in it is formed, and a second method code, which accesses the data stored in those slot data by specifying and executing the access procedure code stored in the slot data specified by that first method code, is defined. The first method code can, for example, be an open method or a close method. The second method code consists of, for example, a read method code and write method code for the purpose of specifying and executing the read procedure code and the write procedure code stored in the slot data specified by the first method code, respectively, or a type method code for the purpose of specifying and executing the type procedure code stored in the slot data specified by the first method code.

The observable object and the observer object are respectively processed by a computer.

In the first aspect of the present invention, the observer object, for example, acquires a slot descriptor for the purpose of identifying slot data, by opening the slot data of the observable object using the slot name in which they are stored. By executing the read method code or the write method code for that slot descriptor, the read procedure code or the write procedure code stored in the slot data can be called. Consequently, the relation between the observer object and the observable object can be determined dynamically at the time of execution by specifying the slot name (the slot descriptor), without need to define them in the class source codes which define those objects. In this way, it is possible to develop and operate a flexible and efficient system for communication between objects.

In the first aspect of the present invention as described above, an update method code (update method) that issues update events for the purpose of posting data changes with respect to all other observer objects connected to the slot data, for which data changes have been detected by detecting the fact that data are stored in any of the slot data defined by the observable object, can be formed to be additionally included in the observable object. Together with this, in the first preferred embodiment of the present invention described above, the observable object is formed so as to include an isModified procedure code that detects whether or not data stored in each of the slot data defined by the observable object have changed. Then, the observer object can be formed so as to include the second method code which includes an isModified method code for the purpose of specifying the slot data specified by the first method code and executing the isModified procedure code included in the observable object.

By means of this additive type of configuration, data stored in the slot data defined by one observable object can be referred to by a plurality of observer objects simultaneously. By posting update events and executing the isModified method code, the compatibility of the observation states of data stored in the slot data defined in the observable objects being referred to simultaneously by a plurality of observer objects can be maintained in all observer objects.

The second aspect of the present invention presupposes that there is a method of communication between objects that performs communication between a plurality of objects through a network.

In the second aspect of the present invention, first, in a first computer, an observable object, for which one or more sets of slot data, in which the slot name, data, and an access procedure code that performs access with respect to those data are defined (the observable 101), is formed.

Next, in the first computer, as shown i FIG. 4, a net-observer object (net-observer 401), in which at least (1) a first reception procedure code, which receives access information with respect to the observable object formed in the first computer from a network; (2) a first method code, which specifies any of the slot data defined in the observable object formed in the first computer by specifying the slot name stored in any of the slot data based on that access information; (3) a second method code, for the purpose of accessing data stored in those slot data by specifying and executing the access procedure code stored in the slot data specified by the first method code based on the access information; and (4) a first transmission procedure code that transmits the result of that access to the source of the access information that was received through the network; are defined, is formed.

Meanwhile, in a second computer, a net-observable object (net-observable 402) is formed. In the net-observable object one or more sets of slot data, which are slot data corresponding to the first slot data which are slot data defined by the observable object formed in the first computer, and in which at least (1) the same slot name as the slot name stored in the first slot data; and (2) an access procedure code which sends access information for the purpose of accessing the access procedure code stored in the first slot data with respect to the net-observer object formed in the first computer to the network toward that net-observer object; are stored, are defined.

In addition, in the second computer, an observer object (observer 102), for which (1) a first method code that specifies any of the slot data defined in the net-observable object by specifying the slot name of one of the sets, and (2) a second method code for the purpose of specifying and executing the access procedure code stored in the slot data specified by that first method code, are defined, is formed.

Then, in the first computer, the observable object and the net-observer object are processed, and, in the second computer, the observer object and the net-observable object are processed.

In the configuration of the second aspect of the present invention described above, reference to the observable object by the observer object, including the net-observer object and also the net-observable object, is performed using the slot name stored in the slot data of that observable object. For this reason, in a case in which the observer object in the second computer accesses data stored in any of the slot data defined in the observable object in the first computer, the observable object in the first computer can be referred to by only specifying the slot name of the slot data of the net-observable object corresponding to the observable object of the first computer created in the second computer, without paying attention to the network.

In the case described above, there can be a plurality of second computers connected to the network; and the network is configured so that the plurality of observer objects on the plurality of second computers can refer to the observable object in the first computer connected to the network simultaneously.

In the configuration of the first or the second aspect of the present invention described above, a collection of a observer object and a plurality of observable objects which refer to them is configured as a single functional unit. The reference relationship between two such functional units can be made completely symmetrical by having object communication between those functional units performed by the respective observer objects and observable objects belonging to them.

In the third aspect of the present invention, responses are given to events issued by a screen object. A screen display routine performs display processing with respect to the screen object. It is a precondition that the screen display system uses the method of communication between objects provided by the first and second aspects of the present invention described above. The combination of the screen object and the screen display routine possesses a configuration such that they are realized by a combination of observer objects and observable objects.

In the configuration of the third aspect of the present invention described above, communication processing relating to the issuing of events and display processing can be unified as communication processing using the slot data between observer objects and observable objects, making efficient development and operation of a screen display system possible.

BRIEF DESCRIPTION OF THE DRAWINGS

Other purposes and features of the present invention can be easily understood by a practitioner of this art from the description of the preferred embodiment of this invention together with the attached drawings.

FIG. 1 is a basic configuration diagram of the preferred embodiment of the present invention.

FIG. 3 is an explanatory diagram of the method related to the protocol between an observable and an observer.

FIG. 4 is an explanatory diagram of the network configuration of the preferred embodiment of the present invention.

DESCRIPTION OF THE PREFERRED EMBODIMENT

Figure 2:
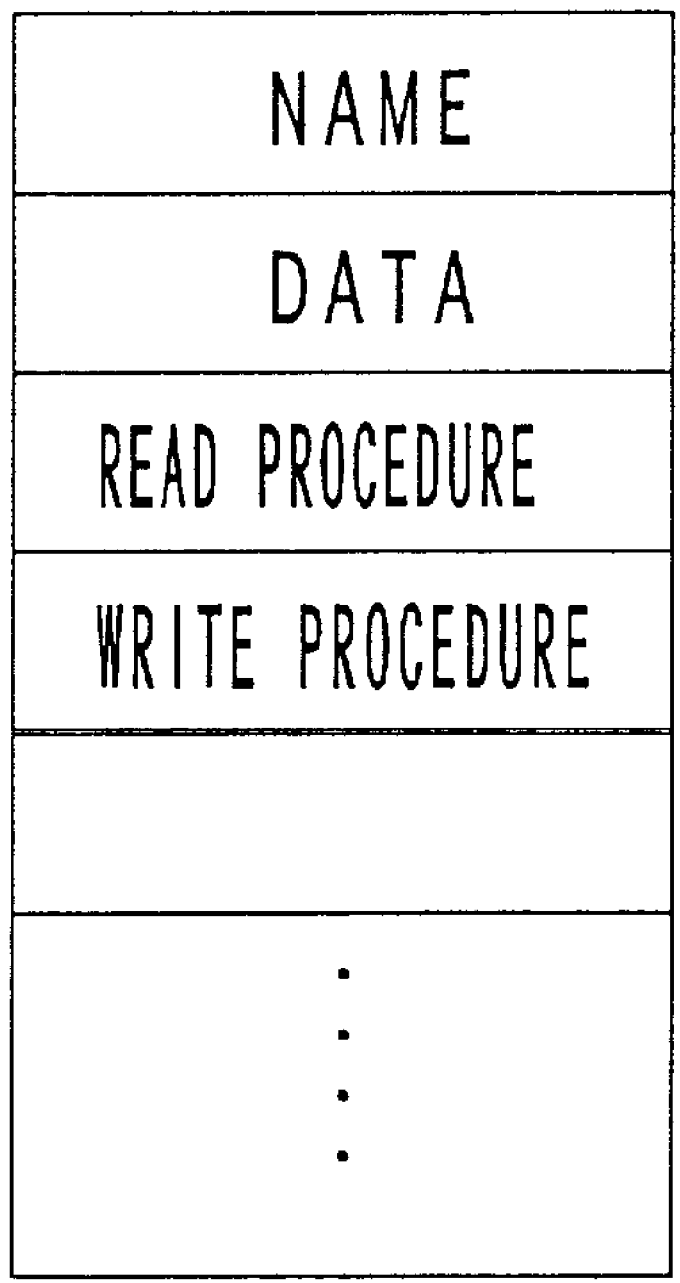
FIG. 2 is a configuration diagram of a slot.

The details of the preferred embodiment of the present invention will be described below, referring to the drawings.

FIG. 1 is a basic configuration diagram of the preferred embodiment of the present invention.

First, in this preferred embodiment, the concept of an observable 101 and an observer 102 is used as a model for communication between objects. The observable 101 and the observer 102 are both objects and this model possesses the relationship that the observer 102 refers to (accesses) the observable 101.

The first characteristic of the preferred embodiment of the present invention is that reference to the observable 101 by the observer 102 is performed only through the interface called the slot 103, defined in the observable 101.

The slot 103 is an interface (for example, a structural body) which the observable 101 possesses with respect to the external observer 102. The observable 101 can possess a plurality of the slots 103.

As shown in FIG. 2, this slot 103 consists of a "name", "data" that have a specified format, a "read procedure" code and a "write procedure" code. A "read procedure" and a "write procedure" can be defined in each slot 103. As the default, the "read procedure" executes fetching of data, while the "write procedure" executes writing to data.

By accessing the slot 103 of the observable 101 by means of the "name" stored in it, the observer 102 can acquire a slot descriptor for the purpose of identifying the slot 103, and then, by executing the read method or the write method with respect to that slot descriptor, can call the "read procedure" or the "write procedure" of the slot 103.

Consequently, the relationship between the observer 102 and the observable 101 does not require to be clearly recorded in the class source code that defines the observer 102 and the observable 101. It can be determined dynamically at the time of execution through specification of the "name" (slot descriptor). In this way, the third problem with the existing technology as described above is solved.

In the preferred embodiment of the present invention, when the "data" of the observable 101 are changed, an event called an "update" that indicates the change ("update" in FIG. 1) is posted to the observer 102 that is referring to that observable 101. In this way, the observer 102 can always refer to the latest state of the observable 101. This configuration makes it possible for a plurality of observers 102 to refer to one observable 101 simultaneously. That is to say, the system is configured so that when the "data" of an observable 101 change, an "update" event is posted to all of the observers 102 that are referring to that observable 101. As a result, compatibility of the observed state of an observable 101 can be maintained in all observers 102 that are referring to it. This solves the first problem with the existing technology as described above.

In addition, the observer 102 itself can also become an observable 101 referred to by another observer 102 by possessing a slot 103. In this way, the relationship between the observer 102 and the observable 101 becomes equal, solving the second problem with existing technology as described above.

FIG. 3 is a diagram explaining a method related to the protocol between the observable 101 and the observer 102.

First, the open method shown in FIG. 3(a) and the close method shown in FIG. 3(b) are defined as methods of the protocol that controls the reference relationship with respect to the observable 101.

The open method shown in FIG. 3(a) determines that the observer 102 will refer to the slot 103 that possesses the "name" as "slotname" of the observable 101 (see FIG. 2). This open method establishes a reference relationship between the observer 102 and the observable 101. The data type of "slotname" is a character string; the return value of the open method is a slot descriptor which has the data type "SlotDescriptor". After the execution of the open method, by using the slot descriptor that was returned by the method, it becomes possible to access the "data" of the slot 103 (see FIG. 2) corresponding to it.

In the configuration shown in FIG. 1, the observable 101 possesses three slots 103, "slot a", "slot b" and "slot c". The observer 102 (#1) establishes reference relationships corresponding, respectively, to the slot 103 ("slot a") and the slot 103 ("slot b") of the observable 101 by executing the two open methods listed below, and acquiring the slot descriptors a and b.

a=open("slot a")
b=open("slot b")

Similarly, the observers 102 (#2) and 102 (#3) establish reference relationships corresponding to the slot 103 ("slot b") and the slot 103 ("slot c") of the observable 101 by executing the open methods listed below and acquiring the slot descriptors b' and c.

b'=open("slot b")
c=open("slot c")

Next, the close method shown in FIG. 3(b) determines the termination of the reference relationship between the observer 102 and the slot 103 of the specified observable 101. This slot 103 of the specified observable 101 is specified by the slot descriptor "desc" which has the form "SlotDescriptor" given as an argument of the close method. When execution of this close method results in there not being one slot 103 of the observable 101 that has been opened by the observer 102, then the reference relationship with respect to that observable 101 is terminated. The return value of the close method has the data type "void" which is a data type showing that no effective value is returned.

Protocol methods related to the slot descriptor acquired by the open method described above, which are the read method shown in FIG. 3(c), the write method shown in FIG. 3(d), the isModified method shown in FIG. 3(e), and the type method shown in FIG. 3(f), are defined.

The read method shown in FIG. 3(c) executes the "read procedure" (see FIG. 2) in the slot 103 of the specified observable 101 specified by the slot descriptor "desc" given as desc.read( ). Read data are returned as return values of the read method; their data type is "Object", the same as the type of "data" (see FIG. 2) in the slot 103.

In the configuration shown in FIG. 1, when an update event is issued, as described below, the observers 102 (#1) and 102 (#2) read data out of the slot 103 ("slot b") of the observable 101 by executing each of the read methods listed below with respect to the slot 103.

b. read( )
b'. read( )

The write method shown in FIG. 3(d) executes the "write procedure" (see FIG. 2) in the slot 103 of the specified observable 101 that is specified by the slot descriptor "desc" given as desc.write( ). Write object data are given as the argument "obj" of the write method, the data type of which is "Object", the same as the type of "data" (see FIG. 2) in the slot 103.

In the configuration shown in FIG. 1, the observer 102 (#2) writes data "obj" in the "data" area of the slot 103 ("slot b") in the observable 101 by executing the write method listed below with respect to the slot 103 ("slot b").

b'. write(obj)

The isModified method shown in FIG. 3(e) executes the "isModified procedure", not shown in any of the figures, in the slot 103 of the specified observable 101, specified by the slot descriptor "desc" given as desc.isModified( ). This procedure returns the boolean value "true" if the "data" in the slot 103 have been changed, or the boolean value "false" if the data have not been changed.

In the configuration shown in FIG. 1, when an update event, to be described below, is issued, the observers 102 (#1), 102 (#2) and 102 (#3) detect whether or not the "data" in each of the slots 103 have been changed, for each of the slots 103 in the observable 101, by executing the isModified methods listed below with respect to each of the slots 103.

a.isModified( )
b.isModified( )
b'.isModified( )
c.isModified( )

When an update event is issued, each observer 102 can maintain compatibility with the observed state with respect to the observable 101 by executing this isModified method.

The type method shown in FIG. 3(f) executes a "type procedure", not shown in the figures, in the slot 103 of the specified observable 101, specified by the slot descriptor "desc" given as the desc.type( ). This procedure returns the type information for the "data" in the slot 103. The observer 102 can obtain the type information for the "data" in the slot 103 of the observable 101 before the read method or the write method is issued.

Finally, the update method shown in FIG. 3(g) is defined as the method of the protocol which possesses the direction from the observable 101 to the observer 102. This update method is described in the source code side that defines the observable 101. When a "write procedure" with respect to the "data" in any of the slots 103 of the observable 101 is executed, an update event is issued with respect to all of the observers 102 connected to that observable 101 in order to indicate that those "data" have been modified.

In the configuration shown in FIG. 1, when, for example, the observer 102 (#2) writes the data "obj" into the "data" area in the slot 103 ("slot b") by executing the method "b'.write(obj)" with respect to the specified slot 103 ("slot b") in the observable 101, the observable 101 issues an update event to each of the observers 102 (#1) to 102 (#3) connected to it by executing the update method.

When the observer 102 (#1) receives the update event, it detects the fact that the "data" inside the slot 103 ("slot b") have been modified by executing the methods "a.isModified( )" and "b.isModified( )" with respect to the slot 103 ("slot a") and the slot 103 ("slot b") in the observable 101, these slots 103 being currently opened by the observer 102 (#1). Then the observer 102 (#1) reads the modified "data" by executing the method "b.read( )" with respect to the slot 103 ("slot b") in the observable 101.

Similarly, when the observer 102 (#2) receives the update event, it detects the fact that the "data" in the slot 103 ("slot b") have been modified by executing the method "b'.isModified( )" with respect to the slot 103 ("slot b") in the observable 101, this slot 103 being currently opened by the observer 102 (#2). Then the observer 102 (#2) reads the modified "data" by executing the method "b'.read( )" with respect to the slot 103 ("slot b") in the observable 101.

Further, when the observer 102 (#3) receives the update event, it detects the fact that the "data" in the slot 103 ("slot c") have not been modified by executing the method "c.isModified"( )" with respect to the slot 103 ("slot c") in the observable 101, this slot 103 being currently opened by the observer 102 (#3).

FIG. 4 is a diagram that explains the case in which reference to the observable 101 by the observer 102 is performed via a network in the preferred embodiment of the present invention.

When the preferred embodiment of the present invention is in the form of a network, a group of net-observers 401 and net-observables 402, which is a group of observers and observables for the purpose of relaying communications between objects between sites connected by the network, is formed as shown in FIG. 4(a).

The observable 101 at the site A specifies an address (for example, an IP address) of the computer at site B where the observer 102 that refers to it is located, and issues an instruction to create the group consisting of the net-observer 401 and the net-observable 402. In this case, it is possible to specify a plurality of sites B at which observers 102 are located.

As a result, first, in the computer at site A where the observable 101 is located, a net-observer 401, that possesses a function that refers to that observable 101 and a function that executes network communication with the net-observable 402 at site B, for example, using a socket, is created.

Next, a request to create the net-observable 402 is issued from the computer at site A to the computer at site B in which the observer 102 that is referring to the observable 101 is located. As a result, in the computer at site B, the net-observable 402, that possesses a function that processes the reference by the observer 102 and a function that executes the network communication with the net-observer 401 at site A, is created. Here, if there is a plurality of sites B in which observers 102 that refer to the observable 101 at site A are located, then a plurality of net-observers 401 are created in the computer at site A. That is to say, in this case, a plurality of net-observers 401 are created in the computer at site A with respect to the one observable 101.

Here, the slots 103 (the slot group 103) in the observable 101 at site A, and the slots 103 (the slot group 103) in the net-observable 402 that was created at site B, are in a one-to-one correspondence.

When the observer 102 at site B refers to the "data" (FIG. 2) in the specified slot 103 of the observable 101 at site A, the identical slot 103 as the specified slot 103 of the net-observable 402 at site B is opened (see FIG. 3 (a)) using its "name" (FIG. 2). Then, using the slot descriptor that is obtained as a result, the various methods such as the read method and the write method, etc. (see FIGS. 3 (c) to (f)), are executed.

As a result, the specified procedure in the specified slot 103 of the net-observable 402 at site B is started, and, by means of this procedure, access information from the observer 102 at site B is relayed to the net-observer 401 at site A. In this case, for example, a network communication method using a socket, which is one method of communication between protocols, can be adopted.

When the net-observer 401 at site A receives access information from the net-observable 402 at site B that the observer 102 at site B has accessed, it opens the specified slot 103 of the observable 101 at site A, converts the access information to a method with respect to that slot 103, and executes the method.

As a result, the "data" of the observable 101 at site A are referred to, and the result is returned to the net-observer 401 at site A.

The net-observer 401 at site A relays that result to the net-observable 402 at site B.

When the net-observable 402 at site B receives the access result from the net-observer 401 at site A, that access result is returned to the process of the procedure that relayed the access information created by the observer 102 at site B.

This procedure returns the access result to the observer 102 at site B that started it.

As was explained above, when the observer 102 at site B refers to the "data" (see FIG. 2) in the slot 103 of the observable 101 at site A, all that happens is that the specified object is changed from the observable 101 at site A to the net-observable 402 at site B; this reference can be carried out without considering the type of network communications.

Examples of coding of the net-observer 401 and the net-observable 402 are shown in FIG. 4(b). This example shows mainly the part that processes the write method issued from the observer 102 at site B with respect to the observable 101 at site A.

First, the net-observer 401 at site A, at the time of starting, for example, starts a reception demon process that possesses the coding content shown schematically on the right side of FIG. 4(b). This reception demon process observes and processes the information relayed from the net-observable 402 at site B. Meanwhile, the net-observable 402 at site B also, at the time of starting, for example, starts a reception demon process which possesses the coding content shown schematically on the left side of FIG. 4(b). This reception demon process observes and processes the information relayed from the net-observer 401 at site A.

In addition, in the coding of the respective procedures of the respective slots 103 of the net-observable 402 at site B, code for the purpose of relaying the access information from the observer 102 at site B to the net-observer 401 at site A is written. #9 to #12 shown in FIG. 4(*b*) show examples of the code that schematically depicts the "write procedure" (see FIG. 2) of one of the slots 103 of the net-observable 402 at site B.

Suppose, for example, that the observer 102 at site B opens one of the slots 103 of the net-observable 402 at site B (see FIG. 3(*a*)), and then executes the write method (see FIG. 3(*d*)) with respect to that slot 103.

As a result of this, for example, the group of codes of the "write procedure" of one of the slots 103 of the net-observable 402 at site B shown in FIG. 4(*b*) #9 to #12 is executed. In order to avoid congestion, it is desirable for these codes to be executed as individual threads.

Thus, the write instruction shown as #10 is executed. As a result, the access information <write identifier, name, obj, waitid> from the observer 102 at site B given as the second argument of this write instruction is relayed to the net-observer 401 at site A. Here, the "write identifier" is the identifier that indicates that the observer 102 at site B has issued the write method. In addition, the "name" (see FIG. 2) of the slot 103 including the write instruction is specified as the "name". Further, obj is the object data specified as an argument in the write method issued by the observer 102 at site B. "waitId" is used in control of the wait instruction to be described below. The first argument "soc" of the write instruction is a socket descriptor for the purpose of identifying the socket connection on the network.

After the write instruction shown as #10 has been executed, the threads in which these codes were executed are put into the wait condition by the wait instruction shown as #11. This wait condition is released when a post instruction, which indicates that a response to the write instruction has been received from the net-observer 401 at site A, is received from the reception demon process which the net-observable 402 at site B shown on the left side of FIG. 4(*b*) possesses. If the "waitId" that is an argument of the wait instruction agrees with the "waitId" that is an argument of the post instruction, the wait condition of the thread in which that wait instruction was executed is released. Thus, a plurality of procedures can be controlled in parallel.

The reception demon process of the net-observer 401 at site A monitors the issuance of commands from said site B net-observable 402. Specifically, in the infinite loop created by the for block of this reception demon process shown as #13 to #19 in FIG. 4(*b*), first the access information relayed from the net-observable 402 at site B is read as the list <command identifier, name, obj, waitid> by the read(soc) statement shown as #14. The argument "soc" is a socket descriptor. The access information <write identifier, name, obj, waitid> created by the write instruction from the site B net-observable 402 is received by this read(soc) statement.

Next, the switch block shown as #15 to #18 for the purpose of separating different cases according to the "command identifier" in the received access information is executed; this executes the case block corresponding to the received command identifier. In the example described above, the "command identifier" is a "write identifier", so the case block that starts from #16 is executed. In order to avoid a congestion, it is desirable for this case block to be coded so that execution takes place in independent threads.

In this case block, first, the specified slot 103 of the observable 101 at site A corresponding to the "name" in the access information is acquired, (specifically, the slot descriptor obtained by the open method previously executed with respect to that slot 103 is acquired). Then the write method with respect to that slot 103 starts with "obj" in the access information as an argument.

As a result, the "write procedure" (see FIG. 2) in the specified slot 103 of the site A observable 101 is executed.

After that, in the case block described above, the write instruction indicated by #17 is executed. As a result, the response information <END identifier, waitid> given as the second argument of this write instruction is relayed to the net-observable 402 at site B. Here, the "END identifier" is the identifier that indicates that the issuance of the write method with respect to the observable 101 at site A has been completed. The "waitId" is equal to the "waitId" received by the instruction #14. The argument "soc" is a socket descriptor.

The reception demon process of the net-observable 402 at site B monitors the issuance of commands from the site A net-observer 401. Specifically, in the infinite loop created by the for block of this reception demon process indicated as FIG. 4(*b*) #1 to #8, first, the response information relayed from the net-observer 401 at site A is read by the read(soc) statement shown as #2. The argument "soc" is a socket descriptor. The response information <END identifier, waitId> created by the write instruction from the site A net-observer 401 is received by this read(soc) statement.

Next, the switch block #3 to #7 is executed, and thus the case block corresponding to the received identifier is executed. In the example described above, since the "END identifier" is received, the case block that starts from #4 is executed.

In this case block, the post instruction having the received "waitId" as an argument is executed. As a result, as described above, the wait condition of the thread, in which the wait instruction that was executed with the same "waitId" as the "waitId" as an argument was executed, is released, and a response is returned to the observer 102 at site B in which the write method was executed.

Here, reference to the observables by the observers, including the net-observer 401 and the net-observable 402, is performed using the "name" of the slot 103 that is possessed by the observable. For this reason, when the observer 102 at site B refers to the observable 101 at site A, the observable 101 at site A can be referred to simply by specifying the "name" of the slot 103 that is possessed by the net-observable 402 corresponding to the site A observable 101 created at site B, without considering the type of network communications. This is also a major feature related to this invention that could not be obtained with the previous technology.

A GUI control device is a specific example of the configuration of the preferred embodiment of this invention as described up to this point. In a GUI control device, a screen display routine performs display processing with respect to the screen objects in response to events issued by screen objects specifically related to, for example, the window screen, keyboard, mouse, etc. In addition, the screen object and the screen display routine can conceivably be located in different site computers connected by a network.

When the configuration of the preferred embodiment of the present invention as described above is applied to this kind of configuration, the screen object is configured as the observable 101, and the screen display routine is configured as the observer 102. Communication processing related to the issuance of events and display processing can be unified as communication processing using the slot 103, between the observer 102 and the observable 101.

Another specific example that can be grouped with the example described above, is component ware that permits GUI applications to be easily created by superimposing views of software components pads such as forms, buttons, list boxes, etc. in a GUI on the development window.

Here, for example, in a case in which a plurality of forms are combined to form a single GUI application, a dispersed development environment in which the various forms are developed in parallel by a plurality of development members can be conceived. In this kind of dispersed development environment, it is desirable if, on a window screen being used by one development member, the form object under development by that member himself can be displayed at the same time as a form object under development by another member. In this case, if one member modifies the form that he himself is developing, it is necessary for that modification to be posted to the forms which all of the other members are developing that refer to that form. It is necessary for this kind of posting of modifications to be conducted mutually among forms, among the pads attached to the forms, and between the forms and the pads.

Each pad is configured as an observable 101 or an observer 102, which are objects. By unifying the pad modifications and modification postings by communication using the slots 103 described above, a flexible dispersed development environment with a high degree of freedom can be realized.

Further, as described above, by using a configuration in which communication between the observer 102 and the observable 101 is performed through a network, it also becomes possible for development environments to be shared among a plurality of development members operating computers at different sites.

What is claimed is:

1. A method for communicating and establishing linkages among a plurality of objects, said method comprising the steps of:
    configuring an observable object to include at least one set of slot data, each set storing a slot name, data, and an access procedure code that performs access with respect to the data in said slot data;
    configuring an observer object to include a first method code specifying any of said slot data defined in said observable object by specifying the slot name stored therein, and a second method code for accessing the data stored in said slot data by specifying and executing the access procedure code stored in said slot data specified by the first method code; and
    executing said observable object and said observer object.

2. The method according to claim 1, further comprising the step of:
    configuring said observable object such that it also includes an update method code that issues update events for the purpose of posting data changes with respect to all observer objects connected to slot data in which changes in said data have been detected, by detecting the fact that the data stored in any of the slot data defined in said observable object have changed.

3. The method according to claim 1, further comprising the steps of:
    configuring said observable object such that the access procedure code stored in the slot data defined in said observable object includes a read procedure code that reads out the data stored in said slot data and a write procedure code that modifies the data stored in said slot data; and
    configuring said observer object such that said second method code included in it includes a read method code and a write method code for the purpose of specifying and executing, respectively, the read procedure code and the write procedure code that are stored in the slot data specified by said first method code.

4. The method according to claim 1, further comprising the steps of:
    configuring said observable object such that the access procedure code stored in the slot data defined in said observable object includes a type procedure code that detects the type of the data stored in said slot data; and
    configuring said observer object such that said second method code stored in said observer object includes a type method code for the purpose of specifying and executing the type procedure code stored in the slot data.

5. The method according to claim 1, further comprising the steps of:
    configuring said observable object such that it includes an isModified procedure code that detects whether or not the data stored in each of the slot data defined in said observable object have changed; and
    configuring said observer object such that said second method code included in it specifies the slot data specified by said first method code, and includes an isModified method code for the purpose of executing the isModified procedure code included in said observable object.

6. The method according to claim 1, further comprising the steps of:
    forming the collection consisting of said observer object and the plurality of said observable objects to which it refers as a single functional unit; and
    configuring such that object communications among a plurality of the functional units are performed by the respected observer objects and observable objects that belong to them.

7. A screen display method that responds to events issued by a screen object, such that a screen display routine performs display processing with respect to the screen object, and that uses the method according to claim 1; said method comprising the step of
    realizing the combination of said screen object and said screen display routine as the combination of said observer object and said observable object.

8. A system for communicating and establishing linkages among a plurality of objects, said system comprising:
    observable object executing means for executing an observable object configured to include at least one set of slot data, each set storing a slot name, data, and an access procedure code that performs access with respect to the data in said slot data; and
    observer object executing means for executing an observer object configured to include a first method code specifying any of said slot data defined in said observable object by specifying the slot name stored therein, and a second method code for accessing the data stored in said slot data by specifying and executing the access procedure code stored in said slot data specified by the first method code.

9. A method for communicating and establishing linkages among plurality of objects through a network, said method comprising the steps of:
    configuring, in a first computer, an observable object such that one or more sets of slot data, in each of which is stored a slot name, data, and an access procedure code that performs access with respect to said data, are defined;

configuring, in said first computer, a net-observer object, in which at least a first reception procedure code that receives access information with respect to the observable object configured in said first computer from said network, a first method code that specifies any of the slot data defined in the observable object configured in said first computer by specifying the slot name stored in them based on said access information, a second method code, for the purpose of accessing the data stored in said slot data by specifying and executing the access procedure code stored in the slot data specified by the first method code, and a first transmission procedure code that transmits the result of that access to the source of the access information that was received, are defined;

configuring, in a second computer, a net-observable object, for which one or more sets of slot data, each of which is slot data corresponding to the first slot data which is said slot data defined by the observable object configured in the first computer, and in each of which is stored at least the same slot name as the slot name stored in the first slot data and a second transmission procedure code which sends access information to the network toward the net-observer object configured in the first computer for the purpose of accessing the access procedure code stored in the first slot data, are defined;

configuring, in said second computer, an observer object, in which the first method code that specifies any of the slot data defined in said net-observable object by specifying the slot name stored in them, and a second method code for the purpose of specifying and executing the access procedure code stored in the slot data specified by said first method code, are defined;

executing, in said first computer, said observable object and said net-observer object; and executing, in said second computer, said observer object and said net-observable object.

10. The method according to claim 9, further comprising the steps of:

forming the collection consisting of said observer object and the plurality of said observable objects to which it refers as a single functional unit; and configuring such that object communications among a plurality of the functional units are performed by the respected observer objects and observable objects that belong to them.

11. A screen display method that responds to events issued by a screen object, such that a screen display routine performs display processing with respect to the screen object, and that uses the method according to claim 9; said method comprising the step of:

realizing the combination of said screen object and said screen display routine as the combination of said observer object and said observable object.

12. A communication system for communicating and establishing linkages among a plurality of objects, said system comprising:

observable object executing means for executing an observable object which is configured, in a first computer, such that one or more sets of slot data, in each of which is stored a slot name, data, and an access procedure code that performs access with respect to said data, are defined;

net-observer object executing means for executing a net-observer object which is configured, in said first computer, in which at least a first reception procedure code that receives access information with respect to the observable object configured in said first computer from said network, a first method code that specifies any of the slot data defined in the observable object configured in said first computer by specifying the slot name stored in them based on said access information, a second method code, for the purpose of accessing the data stored in said slot data by specifying and executing the access procedure code stored in the slot data specified by the first method code, and a first transmission procedure code that transmits the result of that access to the source of the access information that was received, are defined;

net-observable object executing means for executing a net-observable object which is configured, in a second computer, for which one or more sets of slot data, each of which is slot data corresponding to the first slot data which is said slot data defined by the observable object configured in the first computer, and in each of which is stored at least the same slot name as the slot name stored in the first slot data and a second transmission procedure code which sends access information to the network toward the net-observer object configured in the first computer for the purpose of accessing the access procedure code stored in the first slot data, are defined;

observer object executing means for executing an observer object which is configured, in said second computer, in which a first method code that specifies any of the slot data defined in said net-observable object by specifying the slot name stored in them, and a second method code for the purpose of specifying and executing the access procedure code stored in the slot data specified by said first method code, are defined.

13. A computer-readable storage medium used to direct a computer to perform the functions of:

configuring an observable object such that one or more sets of slot data, in each of which is stored a slot name, data, and an access procedure code that performs access with respect to said data, are defined;

configuring an observer object such that a first method code, that specifies any of the slot data defined in said observable object by specifying the slot names stored in them, and a second method code, for the purpose of accessing the data stored in said slot data by specifying and executing the access procedure code stored in the slot data specified by the first method code, are defined; and establishing linkages among objects by executing said observable object and said observer object.

* * * * *